United States Patent Office 3,440,167
Patented Apr. 22, 1969

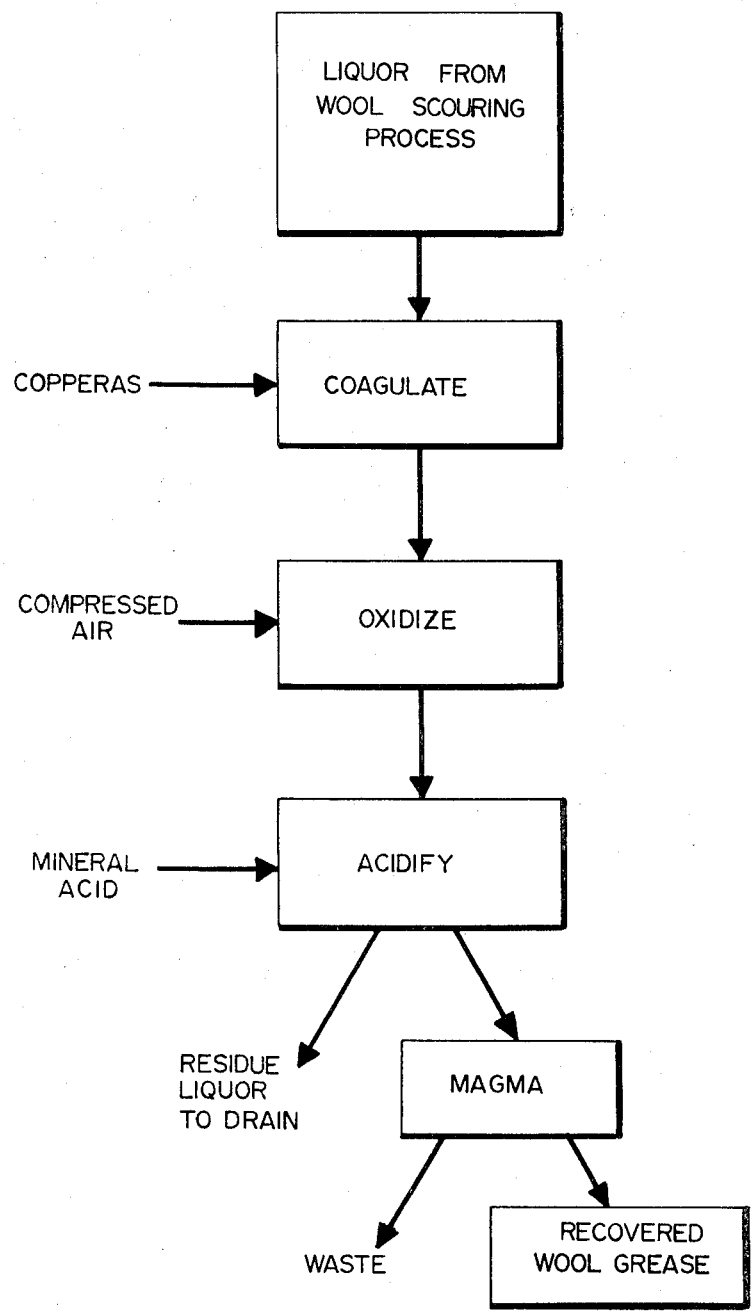

3,440,167
TREATMENT OF LIQUORS FROM THE TREATMENT OF RAW WOOL
Edward Watson Clark and Geoffrey F. Kitchen, Bradford, England, assignors to Woolcombers Limited, also trading as Westbrook Lanolin Company, a company of Great Britain
Filed Apr. 5, 1966, Ser. No. 540,214
Int. Cl. B01d 21/01; C02b 1/20
U.S. Cl. 210—50       11 Claims

ABSTRACT OF THE DISCLOSURE

A method of treating wool scouring liquor containing solid impurities in the form of wool grease and scouring aids such as soap, sodium carbonate and synthetic detergents of both the anionic and nonionic variety which comprises adding to the scouring liquor a coagulant consisting essentially of a copperas solution in the amount of 0.2% to 1.5%, subsequently oxidizing the liquor by contacting it with air as by blowing air through it for about 30–120 minutes at a temperature in the range of 60° F.–212° F., then acidifying the liquor to a pH of about 1.0 to 4.0 to precipitate magma, by adding a strong mineral acid and finally separating the precipitated magma from the liquor and recovering the wool grease from the magma.

---

This invention relates to improvements in the treatment of liquors from the scouring of raw wool in order to purify the liquors or make them more amenable to purification and to recovery of wool grease or other solids therefrom before discharge of the liquors into a public sewer or other drainage system.

The liquors resulting from raw wool scouring are highly concentrated and may contain up to 12 percent by weight of total solids consisting of dissolved, emulsified and suspended matter which is partly organic and partly inorganic in nature, and which originates both from the wool and from aids to scouring such as soap, sodium carbonate or synthetic detergents usually of the anionic or nonionic variety.

Up to about one third of the total solids may consist of wool grease which, besides being a valuable commercial substance, can interfere with the normal methods used for the purification of sewage when discharged into the sewers and is therefore removed in a preliminary process by some public sewage authorities. It is more difficult to remove wool grease and to purify the liquor when it contains appreciable quantities of synthetic detergents as opposed to soap, and some local authorities have imposed restrictions on the use of synthetic detergents for wool scouring on the grounds that it would have an adverse effect on the operation of the sewage works, particularly where these works rely on a preliminary stage for removing grease. Since the replacement of certain advantages, such as resistance to hard water, a method of removing detergents from wool scouring liquor is clearly desirable, especially if in addition the method facilitates treatment of wool scouring liquors containing soap and alkali whereby greater yields of wool grease may be recovered and a purer effluent obtained with proportionately lower charges for treatment thereof by the local authority where such charges are made.

Both physical and chemical processes have been used for treating the liquor. The former include operations such as centrifuging or flotation, but no physical treatment alone, even when aided by a pre-concentration of the liquor by evaporation, can recover more than roughly 60% of the total wool grease in the liquor owing to the stability of the emulsion. Chemico-physical processes are widely used, therefore, either subsequently to the physical treatment or in place thereof, whereby a much greater recovery of wool grease is effected, and the object of the invention is an improvement in such chemico-physical treatment.

The conventional method of treatment consists of acidifying the scouring liquor with a mineral acid, usually sulphuric acid, to a pH of from 2.5 to 4.0 which breaks down the emulsion to a rather variable degree and causes the precipitation of a sludge (usually referred to as "magma") containing most of the wool grease and other fats such as fatty acids from decomposed soap, together with insoluble dirt, clay, sand, etc. The magma is allowed to settle, the supernatant liquor decanted away to the drain and the magma boiled in order to consolidate it before filter-pressing or solvent-extracting to recover wool grease. The residual filter cake is disposed of by tipping by use as a fertilizer or other suitable means.

The decanted supernatant liquor is normally a very cloudy brown to buff coloured liquid still containing appreciable amounts of suspended and emulsified impurities and grease, these amounts being much greater in the case of synthetic detergent-containing liquors, since the detergents are, unlike soap, stable to mineral acid and therefore hold grease and other impurities in the form of a stable, acidic emulsion, increasing the load on a sewage works when the liquors are discharged into a public sewer. Because of this, many methods have been tried or used in the past to improve the conventional method of treating wool scouring liquor or grease-bearing sewage and to increase grease recovery, some being alternatives to the acidification method described and others being used in conjunction therewith.

The basis of most methods is the use of a coagulant to cause coalescence of the suspended impurities. Coagulants mentioned in the literature are aluminium sulphate or chloride, ferric sulphate or chloride, ferrous sulphate ("copperas"), chlorinated copperas, calcium chloride, zinc chloride, barium chloride, lead acetate, lime, calcium hypochlorite, bleaching powder, sodium silicate, sodium aluminate, clay or bentonite, and tannin or other vegetable extracts as well as combinations of some of these substances. Other methods have involved the formation of coagulating iron compounds in situ by passing the liquor over iron turnings after carbonation and then oxidising with air (the so-called "Niers Process"), or by electrolysing the liquor using iron electrodes. Yet another method is to cool the liquor to 60° F. or less before acidification, whereby a much clearer effluent is obtained at the expense of a very bulky magma which is very slow to settle or filter. These methods vary widely in merit according to cost, consumption and availability of the substance, equipment or materials required. The most commercially successful on a large scale have been (1) the Niers process, which requires highly specialised equipment (2) the calcium chloride precipitation, which is expensive due to the price of calcium chloride and the large amounts required (3) the chlorinated copperas process, which required expensive chlorine-resistant equipment as well as the fairly expensive chlorine itself. The basis of the chlorinated copperas process is to prepare a concentrated aqueous solution of copperas (ferrous sulphate, $FeSO_4 \cdot 7H_2O$) and oxidise it by passing in gaseous chlorine, which results in conversion to a mixture of ferric sulphate and ferric chloride. This chlorinated solution is added to the scouring liquor or sewage in suitable dosages followed by acidification whereby clear effluents of increased purity may be obtained after separation of the magma.

The invention comprises a method of treating wool scouring liquor containing soap, synthetic detergent, sodium carbonate or combinations of such scouring agents, by adding to the liquor from 0.2% to 1.5% of copperas either as a pre-oxidised solution, or as an unoxidised solution and subsequently oxidising the liquor for 30 to 120 minutes at a temperature between 60° and 212° F. by the continuous or batch-wise passage therethrough of air; and acidifying the liquor with sulphuric acid or other strong mineral acid to a pH from 1.0 to 4.0 and finally separating the precipitated magma by settlement and decantation, filtration, centrifuging or cyclone separator and recovering the wool grease from the magma by filter-pressing, solvent extraction, or a combination of these processes.

The air may be supplied through perforated pipes or porous diffusers or by high speed aerating mixers, by spraying or jetting the liquor through the air or by allowing the liquor to fall down slatted towers or packed columns to which air is freely supplied or other means.

In carrying out the invention a copperas solution is oxidised with air, which method we have found to be much cheaper and more practicable than chlorination and to result in slightly less dosage being required in the liquor. Copperas is readily available, and no expensive plant is required for its use, a supply of compressed air being normally available in the effluent treatment works.

It is preferred to add the unoxidised unacidified copperas solution to the liquor to be purified and then oxidise it in situ followed by acidification of the liquor. Alternatively, the copperas solution may be pre-oxidised with air and subsequently added to the liquor which is then acidified but in such a case it is preferred to acidify the unoxidised copperas solution with a mineral acid, e.g. sulphuric acid to reduce the precipitation of basic ferric salts during the pre-oxidation.

The addition of copperas, conveniently prepared and stocked as a 5–30% solution in water, imparts a greenish tinge to the liquor and results in the formation of a mixed precipitate of iron soap, hydroxide and carbonate. At the usual temperature of the liquor oxidation with air takes from one half hour to two hours, the greenish colour changing to a sandy brown when oxidation is almost complete. The dosage of copperas required varies from 0.2 to 1.5% of the liquor depending upon the concentration of the liquor. The amount of air required for oxidation of 5,000 gallons of liquor is 50 to 200 cubic feet per minute of free air and it may be introduced to the liquor through perforated pipes at the bottom of a tank, or preferably through air diffusers of porous ceramic or other suitable material. Such diffusers permit not only a more rapid but also a more complete oxidation, and often enable the copperas dosage to be slightly reduced. Other suitable means of contacting the liquor with air may, of course, be used such as spraying it in sheets or jets through the air, allowing it to fall down towers or columns or by agitating it with high speed mixers so as to entrain bubbles. The oxidation may be carried out batch-wise in tanks, or continuously by passing the liquor through a series of tanks or compartments each with its own air supply and in which the average time of contact of the liquor with the air is sufficient for oxidation to be achieved.

To illustrate the relative costs of air- and chlorine-oxidised copperas, the following prices may be assumed:

```
                                              Per ton
Copperas _____ £3. 10. 0d.
Chlorine _____ £591. 0. 0d.
```

Assuming 100% efficiency 213 lbs. of chlorine are required to oxidise 1,668 lbs. of copperas. The cost of 1 ton of chlorinated copperas is therefore £15. 2. 0d. Assuming that 15 H.P. are required for aerating 5,000 gallons of copperas-containing liquor and that electrical power costs 1. 5d. per unit, the cost of oxidising the copperas content will vary widely according to the dosage given and the period of blowing required, but the minimum and maximum cost of oxidising 1 ton of copperas in the liquor will be from £3. 12. 0d. to £6. 12. 0d. Even at its maximum cost, therefore, air-oxidised copperas is less than half the cost of chlorinated copperas. Other comparative prices are:

```
                                                    Per ton
Calcium chloride _____ £16. 15. 0d.
Alumino-ferric (crude aluminum sulfate) _ £15. 0. 0d.
```

Both these coagulants must be used in larger dosages than air-oxidised copperas.

After axidation of the copperas-containing liquor it is acidified with mineral acid in the usual way to a pH of from 1.0 to 4.0 preferably from 2.5 to 3.5 in order to precipitate the magma, the addition of acid being made batch-wise or continuously as desired, but preferably as slowly as possible since coagulation then appears to be more thorough.

In cases where the whole of the coagulated and acidified liquor is to be filtered or settled to remove the magma, it has been found that the rate of filtration or settlement may be greatly increased if the liquor is heated or, preferably, boiled for 10 to 60 minutes after treatment and before filtration or settlement. An even greater increase in the rate is achieved if the liquor is first boiled and then cooled to below the settling point of the grease. Not only does the boiling process consolidate the precipitate but simultaneously coagulates any impurities which will remain suspended in the liquor, and this enables the dosage of air-oxidised copperas to be greatly reduced.

After heating the liquor with copperas, air and acid, with or without boiling and cooling, or by a combination of these methods, the magma may be separated in any suitable way such as by a filter press, a rotary vacuum filter (preferably with a pre-coat of filter aid), a centrifuge or a cyclone separator, etc. We prefer the use of a filter press since then the recovery of grease by repeated steaming and pressing is readily achieved.

Treating wool scouring liquors as hereinbefore described results not only in clear effluents almost completely free of suspended dirt and grease (grease cannot be entirely removed since some is actually held dissolved by surface active agents of natural origin which act as solubilisers) but also in the removal of at least 90% of any nonionic detergent which may be present in the original scouring liquor.

The invention will be illustrated by reference to the following experiments in which a typical strong wool scouring liquor containing a nonionic synthetic detergent was treated in different ways and then filtered on a vacuum filter. The times required for filtration were recorded and the filtrates were subjected to analysis with the results shown in Table 1.

EXAMPLE 1

1 litre of liquor at 120° F. was acidified to pH 3.2 with sulphuric acid and filtered (this corresponds to the conventional process).

EXAMPLE 2

1 litre of liquor at 120° F. was treated with 0.75% of copperas, blown with air for 1 hour, acidified to pH 3.2 with sulphuric acid and filtered.

EXAMPLE 3

1 litre of liquor at 120° F. was acidified to pH 3.2 with sulphuric acid, boiled for 1 hour and filtered whilst hot.

EXAMPLE 4

Similar to Example 3, but the boiled liquor was cooled to 70° F. before filtration.

EXAMPLE 5

1 litre of liquor at 120° F. was treated with 0.75% of copperas, blown with air for 1 hour, acidified to pH 3.2 with sulphuric acid, boiled for 1 hour and filtered whilst hot.

EXAMPLE 6

Similar to Example 5, but the boiled liquor was cooled to 70° F. before filtration.

TABLE 1

| Experiment No. | Filtration time, minutes | Filtrate analysis (in parts per million) | | | |
|---|---|---|---|---|---|
| | | Suspended solids | Total grease | 4 hr. permanganate value | Nonionic detergent |
| Original liquor | | 34,400 | 20,368 | 6,193 | 750 |
| 1 | 25 | 12,200 | 7,680 | 4,364 | 150 |
| 2 | 9 | 80 | 1,072 | 2,960 | 50 |
| 3 | 8 | 1,880 | 2,260 | 3,539 | 80 |
| 4 | 4 | 340 | 1,304 | 3,037 | 70 |
| 5 | 3 | 232 | 1,220 | 3,005 | 70 |
| 6 | 1 | 25 | 1,027 | 2,861 | 45 |

These results clearly show the increased purity of effluent and better detergent removal afforded by our invention. Moreover a comparison of experiments 1 and 6 shows that where the total volume of liquor treated per week 500,000 gallons (a typical figure for a large wool scouring plant) the increased grease recovery in the magma would be approximately 7,500 lbs. per week, the value of which could be offset against the treatment costs.

The invention has been described with reference to examples illustrating the recovery of wool grease from non-ionic detergent liquors, but it may also be employed for the recovery of wool grease from scouring liquors containing soap and alkali.

What we claim is:

1. A method of treating wool scouring liquor containing impurities in the form of wool grease and scouring aid material consisting essentially of one or more substances of the group consisting of soap, sodium carbonate and synthetic detergents of both the anionic and non-ionic variety: which comprises adding to the scouring liquor a coagulant consisting essentially of a copperas solution in the amount of about 0.2% to 1.5%, subsequently oxidizing the liquor by contacting it with air for about 30–120 minutes at a temperature in the range of 60° F.–212° F., then acidifying the liquor to a pH of about 1.0 to 4.0 to precipitate magma by adding a strong mineral acid, separating the precipitated magma from the liquor, and recovering wool grease from the separated magma.

2. A method of treating wool scouring liquor as in claim 1 in which the liquor is acidified with sulphuric acid.

3. A method of treating wool scouring liquor as in claim 1 in which the precipitated magma is separated by physical treatment of the liquor.

4. A method of treating wool scouring liquor as in claim 1 in which the wool grease is recovered from the magma by filter pressing.

5. A method of treating wool scouring liquor as in claim 1 in which the wool grease is recovered from the magma by solvent extraction.

6. A method of treating wool scouring liquor as in claim 1 in which the liquor is oxidised at a temperature between 100° and 150° F.

7. A method of treating wool scouring liquor as in claim 1 in which the liquor is acidified with sulphuric acid to a pH from 2.5 to 3.5.

8. A method of treating wool scouring liquor as in claim 1 in which the liquor after acidification is boiled.

9. A method of treating wool scouring liquor as in claim 1 in which the copperas solution is pre-oxidised and acidified with sulphuric acid before addition to liquor.

10. A method of treating wool scouring liquor as defined in claim 11, wherein the air is contacted with the liquor by blowing dispersed air through the liquor.

11. A method of treating wool scouring liquor as in claim 8 in which the liquor after boiling is cooled below the setting point of the grease.

References Cited

UNITED STATES PATENTS

| 2,692,184 | 10/1954 | Cabot et al. | 8—139 |
| 2,719,118 | 9/1955 | Bernard et al. | 8—139 XR |
| 2,762,681 | 9/1956 | Crowley | 8—139 |
| 2,897,043 | 7/1959 | Fong | 8—139 |
| 2,903,424 | 9/1959 | Fong | 8—139 XR |

MAYER WEINBLATT, *Primary Examiner.*

U.S. Cl. X.R.

8—139, 141; 210—2, 42